(12) United States Patent
Ali et al.

(10) Patent No.: US 8,479,011 B2
(45) Date of Patent: Jul. 2, 2013

(54) METHOD AND APPARATUS FOR USING CRYPTOGRAPHIC MECHANISMS TO PROVIDE ACCESS TO A PORTABLE DEVICE USING INTEGRATED AUTHENTICATION USING ANOTHER PORTABLE DEVICE

(75) Inventors: Asad Mahboob Ali, Austin, TX (US); Bart John Bombay, Austin, TX (US); Ashish Malpani, Austin, TX (US)

(73) Assignee: Gemalto SA, Meudon (FR)

( * ) Notice: Subject to any disclaimer, the term of this patent is extended or adjusted under 35 U.S.C. 154(b) by 432 days.

(21) Appl. No.: 12/607,047

(22) Filed: Oct. 27, 2009

(65) Prior Publication Data

US 2011/0083017 A1 Apr. 7, 2011

Related U.S. Application Data

(60) Provisional application No. 61/249,570, filed on Oct. 7, 2009.

(51) Int. Cl.
*G06F 21/00* (2006.01)

(52) U.S. Cl.
USPC ........... 713/185; 713/182; 713/189; 713/193; 726/20

(58) Field of Classification Search
USPC ........................... 713/185; 726/16–20, 26–29
See application file for complete search history.

(56) References Cited

U.S. PATENT DOCUMENTS

| | | | | |
|---|---|---|---|---|
| 7,958,370 B2 * | 6/2011 | Hirai et al. | | 713/189 |
| 8,112,637 B2 * | 2/2012 | Spottswood et al. | | 713/193 |
| 8,195,960 B2 * | 6/2012 | Hirai | | 713/193 |
| 2006/0071066 A1 * | 4/2006 | Vanzini et al. | | 235/380 |
| 2007/0016800 A1 | 1/2007 | Spottswood et al. | | |
| 2008/0295160 A1 * | 11/2008 | Cuprin et al. | | 726/7 |
| 2009/0016537 A1 * | 1/2009 | Ju et al. | | 380/278 |
| 2009/0235080 A1 * | 9/2009 | Tirbois et al. | | 713/176 |
| 2009/0271533 A1 * | 10/2009 | Asnaashari | | 710/13 |
| 2010/0070728 A1 * | 3/2010 | James et al. | | 711/164 |

OTHER PUBLICATIONS

Handbook of Applied Cryptography, Identification and Entity Authentication, Jan. 1, 1997, Handbook of Applied Cryptography; CRC Press, Boca Raton, FL, US, pp. 385-424, XP002262234 ISBN: 978-0-8493-8523-0 p. 404-405.
PCT/EP2010/064638 International Search Report, Nov. 11, 2010, European Patent Office, P.B. 5818 Patentlaan 2 NL—2280 HV Rijswijk.

* cited by examiner

*Primary Examiner* — Linglan Edwards
(74) *Attorney, Agent, or Firm* — The Jansson Firm; Pehr B. Jansson

(57) ABSTRACT

A method and system for providing authentication of a user to a first peripheral device connected to a host computer using an authentication of the user on a second peripheral device, thereby allowing the user access to both devices through a single authentication. A security function on the second peripheral device is used to create an authorization phrase. Subsequent accesses to the first peripheral device requires the second peripheral device to re-create the same authorization phrase thereby demonstrating that the same second peripheral device is being used to access the first peripheral device and that a user was successfully authenticated to the second peripheral device. Other systems and methods are disclosed.

15 Claims, 16 Drawing Sheets

METHOD AND APPARATUS FOR USING CRYPTOGRAPHIC MECHANISMS TO PROVIDE ACCESS TO A PORTABLE DEVICE USING INTEGRATED AUTHENTICATION USING ANOTHER PORTABLE DEVICE

CROSS-REFERENCE TO RELATED APPLICATIONS

This application is a non-provisional application claiming priority from provisional application Ser. No. 61/249,570, filed on 7 Oct. 2009, entitled "METHOD AND APPARATUS FOR USING CRYPTOGRAPHIC MECHANISM TO PROVIDE ACCESS TO A PORTABLE DEVICE USING INTEGRATED AUTHENTICATION WITH A SMART CARD," the teachings of which are incorporated by reference herein as if reproduced in full below.

BACKGROUND OF THE INVENTION

The present invention relates generally to information security on portable devices, and more particularly to providing information security on a portable device through authentication of a user on another device and having that authentication apply to the portable device.

In the early $21^{st}$ century advances in technology has changed everyone's life, some for the better, some for the worse. While most persons have a digital life in parallel with their physical life one danger that comes with that is the vulnerability of digital information coming into the wrong hands. Most enterprises, such as corporations and governmental agencies, are very aware of that risk and implement policies to provide for digital security of information stored on their networks, servers, and their employees' personal computers.

However, some advances in technology make even such policies more and more difficult to maintain. Consider, for example, flash drives. A flash drive, also known as a thumb drive, are small flash memory devices that may be attached to a personal computer as a peripheral device for highly portable file storage. It is common to see such drives on keychains, on lanyards, and being left behind very insecurely in desk trays. Yet, it is not uncommon for owners of such devices to use them for storing and transporting highly sensitive information.

Gemalto, S/A of Meudon, France has introduced a flash drive known as Smart Guardian™ that provides security to the information in a private partition on the flash memory module of the flash drive by having that partition secured using a smart card module installed on the flash drive. The data stored in the private partition is stored encrypted and the decryption is managed using cryptography functionality of the smart card module. To access the private partition, a user must authenticate with the flash drive via the smart card module. While that architecture is very secure, one could envision a flash drive without the smart card module also requiring authentication before permitting access to information stored thereon.

One burden that has come with the advances in technology is the heavy load of remembering authentication mechanisms for many different devices and accounts. An average person with a digital life probably has passwords and PINS (personal identification numbers) for a dozen or more computers, computerized devices, and online accounts. Not only is that a burden, it raises the security risk to these devices and accounts in that to manage the passwords users frequently device very insecure ways for keeping track of passwords and PINs ranging from using their own name or other easily remembered phrase, using the same password or PIN for many accounts, to simply writing down the authentication phrase on a sticky-note attached to their computer or other device. Of course, such techniques for password management are highly insecure.

Although enterprises may have password policies, such policies become more difficult to enforce for peripheral devices that are not connected to a network.

Many enterprises now use a corporate badge that is a smart card both for physical access to premises, for conventional identification using a photograph placed on the corporate badge and for authentication of a user to the user's computer and the enterprise network. Because a user must authenticate to the corporate badge before being allowed access to the user's computer and network, and because the user may wish to use a secure flash drive, such as Smart Guardian, with that computer, it would be very desirable to allow the authentication of the user to the corporate badge to automatically operate as an authentication to the flash drive or other secure peripheral devices connected to the computer.

From the foregoing it will be apparent that there is still a need for a method to provide a mechanism by which a user may authenticate to a corporate badge and have that authentication also allow access to other secure peripheral devices connected to the same computer as is the corporate badge.

DETAILED DESCRIPTION OF THE INVENTION

Figure 1:
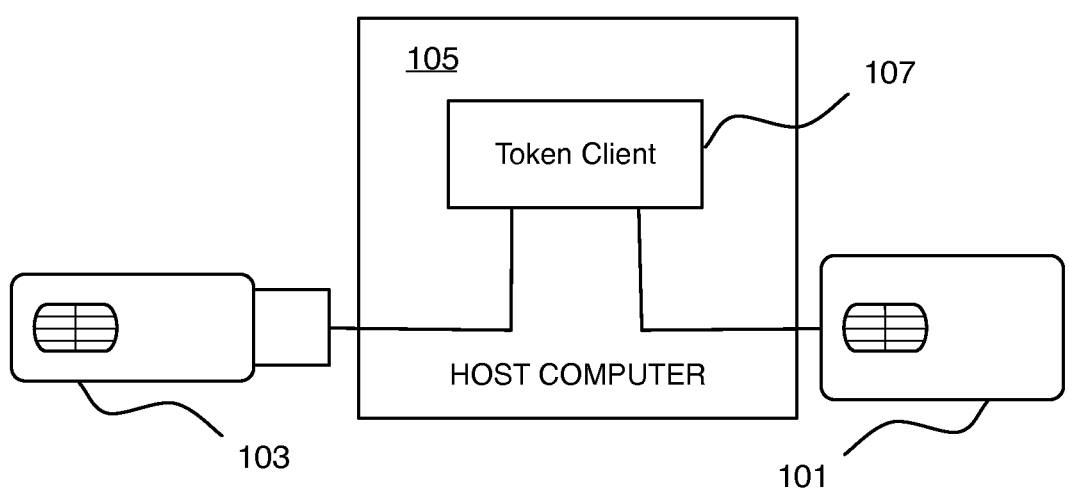
FIG. 1 is a block diagram illustrating a high-level view of two secure peripheral devices connected to a host computer wherein the interaction between the host computer user and the peripheral devices is marshaled by a token client.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is presented that allows a user to authenticate to one peripheral device, e.g., a smart card-based corporate badge, and use that authentication to automatically and securely authenticate with at least one other secure peripheral device, e.g., a secure flash drive.

FIG. 1 is a block diagram illustrating the connection of two peripheral devices simultaneously to a host computer. The first peripheral device 101, for example, a smart card, may be used by a user of the host computer 105, to provide the user's operating environment, to store log on credentials for allowing the user to log on onto the host computer 105 and/or a computer network (not shown). In one mode of operation, to be allowed access to the computer 105 using the credentials stored on the smart card 101[1] by first being authenticated to the smart card 101. Also connected is a second peripheral device 103, for example, a secure flash drive such as the Gemalto S/A Smart Guardian™. In one mode of operation, the secure flash drive 103 may be used for storing information securely. Prior to allowing access to such secure files, or even to store files thereon, the accessing entity must be authenticated, for example, by login on to the secure flash drive 103 using a PIN.

[1] Herein, for the sake of providing an easily-read narrative, the first peripheral device 101 is referred to as the smart card 101 and the second peripheral device 103 is referred to as the secure flash drive 103. That is merely for the convenience of the reader and must not be taken to imply that the first peripheral device 101 can only be a smart card or that the second peripheral device 103 can only be a flash drive.

As noted herein above, managing many login credentials can be a heavy burden on some users and also often compromises data security due to the poor login credential management of some users. To overcome that deficiency in the prior art, a mechanism is described herein by which the user (or other entity such as another peripheral device or program executing on the computer 105 or elsewhere on the network) may be authenticated and authorized to use the smart card 101 and associated services, and that authentication further allows access to the secure flash drive 103. In one embodiment, that authentication mechanism is marshaled by a token client program 107. It should be noted, that when it is stated herein that a particular computer program performs a function or a task, in reality that means and should be taken as meaning that the computer program contains instructions that when executed by a processor of a computer or other device causes the computer or such other device to perform the functions. Thus, it is the host computer 105, executing the instructions of the token client program 107 that actually marshals the authentication mechanism by which the authentication process vis-à-vis the smart card 101 may be used to authorize access to the secure flash drive 103.

Figure 2:
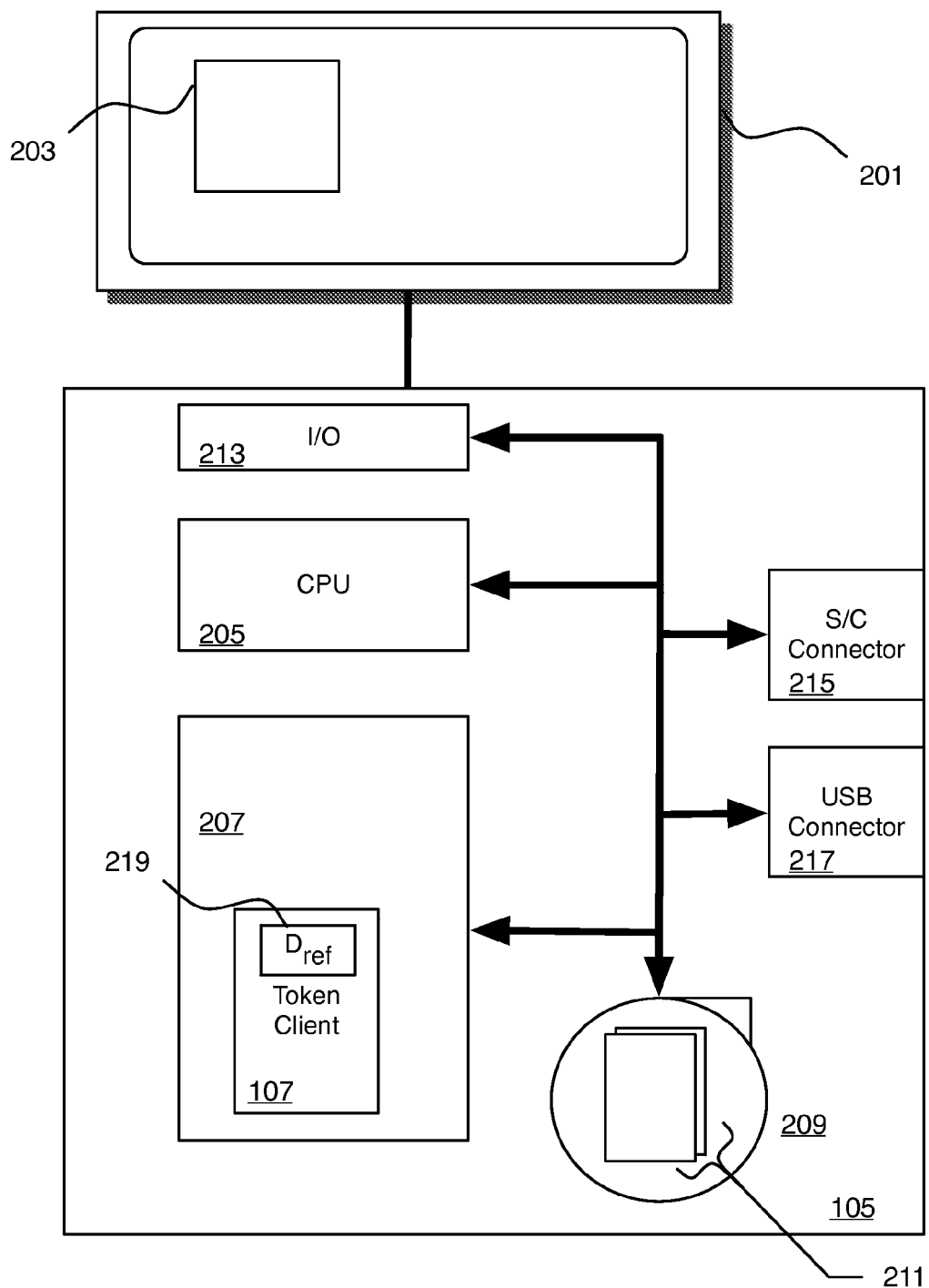
FIG. 2 is a block diagram providing a high-level view of the architecture of the host computer illustrated in FIG. 1.

FIG. 2 is a block diagram of the architecture of the host computer 105 and further illustrating that the host computer 105 may be connected to a display device 201 for displaying graphic user interfaces 203 to a user. The host computer 105 may include a central processing unit 205, a memory 207, and a secondary storage system 209. Typically the secondary storage system 209 (which may be external or internal hard disk drives, read-only memory, firmware, non-volatile memory, etc.) stores computer programs 211 for execution by the central processing unit 205. Other components of the host computer 105 include an input/output module 213, a smart card connector 215 and a USB (universal serial bus) connector 217 for allowing the host computer 105 to connect to input/output devices such as display 201, smart cards 101, and USB peripheral devices such as the flash drive 103, respectively. When the USB flash drive 103 is inserted into the host computer 105 USB connector 217 a token client 107 is loaded from the flash memory of the USB flash drive 103 into the memory 207 (see FIG. 3). As is described herein below, the token client 107 marshals the interaction between the host computer 105 and the flash drive 103.

Figure 3:
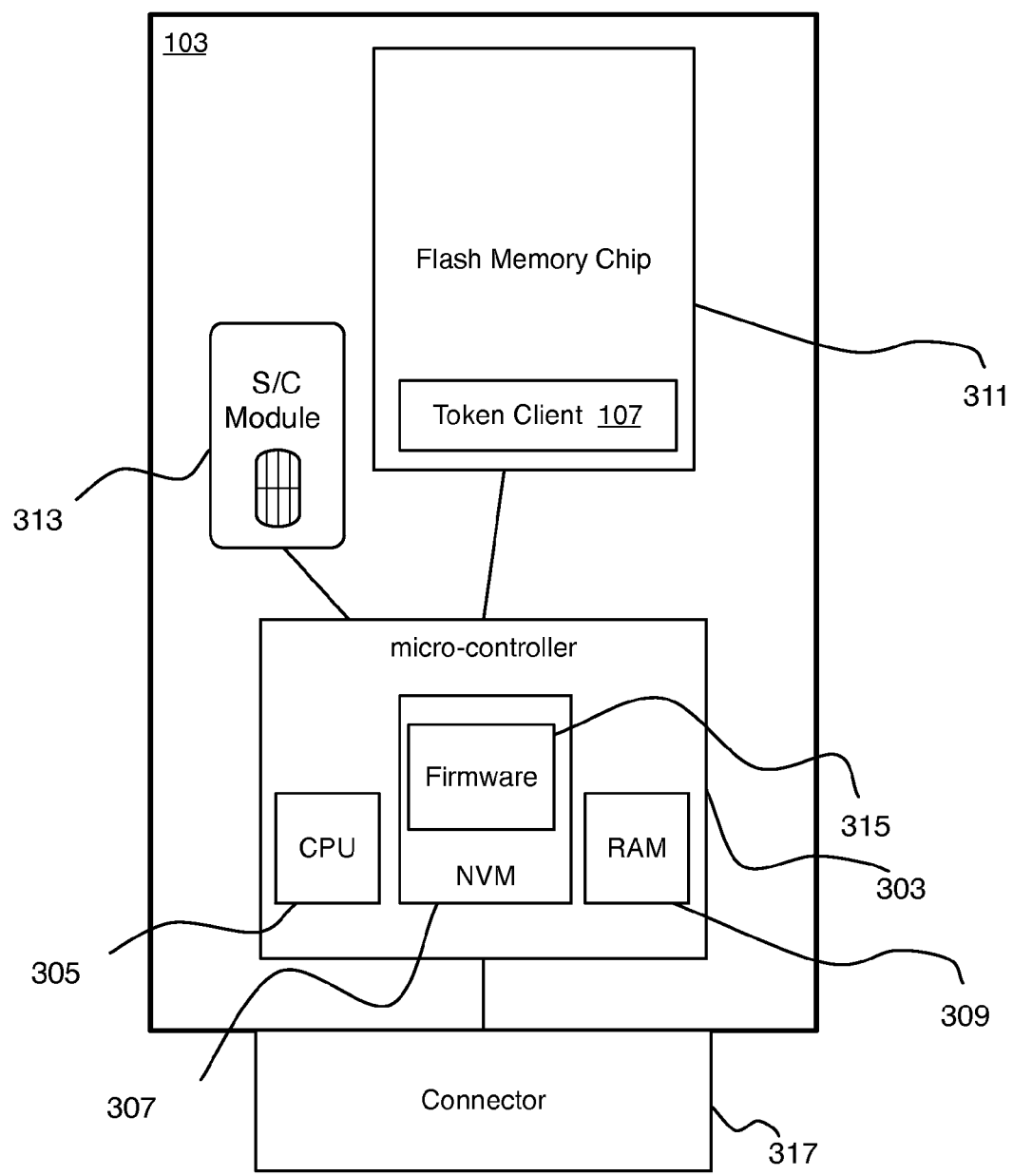
FIG. 3 is a block diagram of one embodiment of a first peripheral device illustrated in FIG. 1, namely, a secure flash drive having a smart card module for providing security functions to protect information stored in flash memory of the secure flash drive.

FIG. 3 is a block diagram illustrating a high-level view of the architecture of a USB flash drive 103 incorporating a smart card module for providing security functionality, e.g., authentication and cryptographic services, to enhance the security of data stored on the USB flash drive 103 (referred to hereinafter as a USB flash drive SC).

A USB flash drive SC 103 is constructed with a USB connector 317, and has a USB flash drive micro-controller 303 having a microprocessor 305, a NVM 307, and a RAM 309, as well as a flash memory chip 311. The flash memory chip contains the token client 107 that is loaded into the memory of the host computer 105 when the USB flash drive SC 103 is inserted into the USB connector 217 of the host computer 105. Additionally the USB flash drive SC 103 contains a smart card module 313 connected to the USB flash drive micro-controller 303.

In one embodiment, the smart card module 313 is used by the USB flash drive SC 103 to authenticate a user and to provide certain cryptographic capabilities. Thus, for example, when the USB flash drive SC 103 is inserted into a computer 105, a logon screen may be presented to a user requesting the user to authenticate himself or herself using a PIN or password. Authentication is then entirely a negotiation between the host computer 105 and the smart card module 313 via the micro-controller 303 with only the result being used by the firmware 315 executing on the USB flash drive micro-controller 303. As is discussed hereinbelow, the direct authentication between a user and the USB flash drive SC 103 may be overridden or replaced by an authentication mechanism marshaled by the token client 107 using authentication via the smart card 101.

In one embodiment, the communication between the host the computer 105 and the USB flash drive SC 103 is performed using the USB mass storage protocol and the USB CCID (Chip Card Interface Device) protocol.

Operations of the USB flash drive micro-controller 303 are according to instructions stored in a firmware control program 315 stored in the NVM 315 (as shown) or, alternatively, in another non-volatile storage of the USB flash drive SC 103, such as flash memory 311. The firmware control program 315 contains start-up instructions executed on initialization of the USB flash drive SC 103. Several of the start-up procedures are discussed in greater detail hereinbelow.

USB enumeration is one function performed during startup of the USB flash drive SC 103. The USB flash drive SC 103 enumerates itself as one or more USB mass storage drives and as a smart card interface device (akin to a USB smart card reader) to allow for communication using the CCID protocol. The firmware control program 315 contains the necessary instructions to act as a CCID device when the host computer 105 directs communication to the smart card module 313.

In an alternative embodiment, the communication between the host computer 105 and the USB flash drive SC 103 is performed using the USB mass storage protocol and the HID (Human Interface Device) protocol.

Operations of the USB flash drive micro-controller 103 are according to instructions stored in a firmware control program 315 stored in the NVM 315 (as shown) or, alternatively, in another non-volatile storage of the USB flash drive SC 103, such as the flash memory 311. The firmware control program 315 contains start-up instructions executed on initialization of the USB flash drive SC 103. USB enumeration is one function performed during startup of the USB flash drive SC 103. The USB flash drive SC 103 enumerates itself as one or more USB mass storage drives and as an HID device (akin to a USB mouse or keyboard) to allow for communication using the HID protocol. This mechanism allows communication to take place over existing device drivers present in all modern operating systems. The firmware control program 315 contains the necessary instructions to act as an HID device when the host computer 105 directs communication to the smart card module 313.

Figure 4:
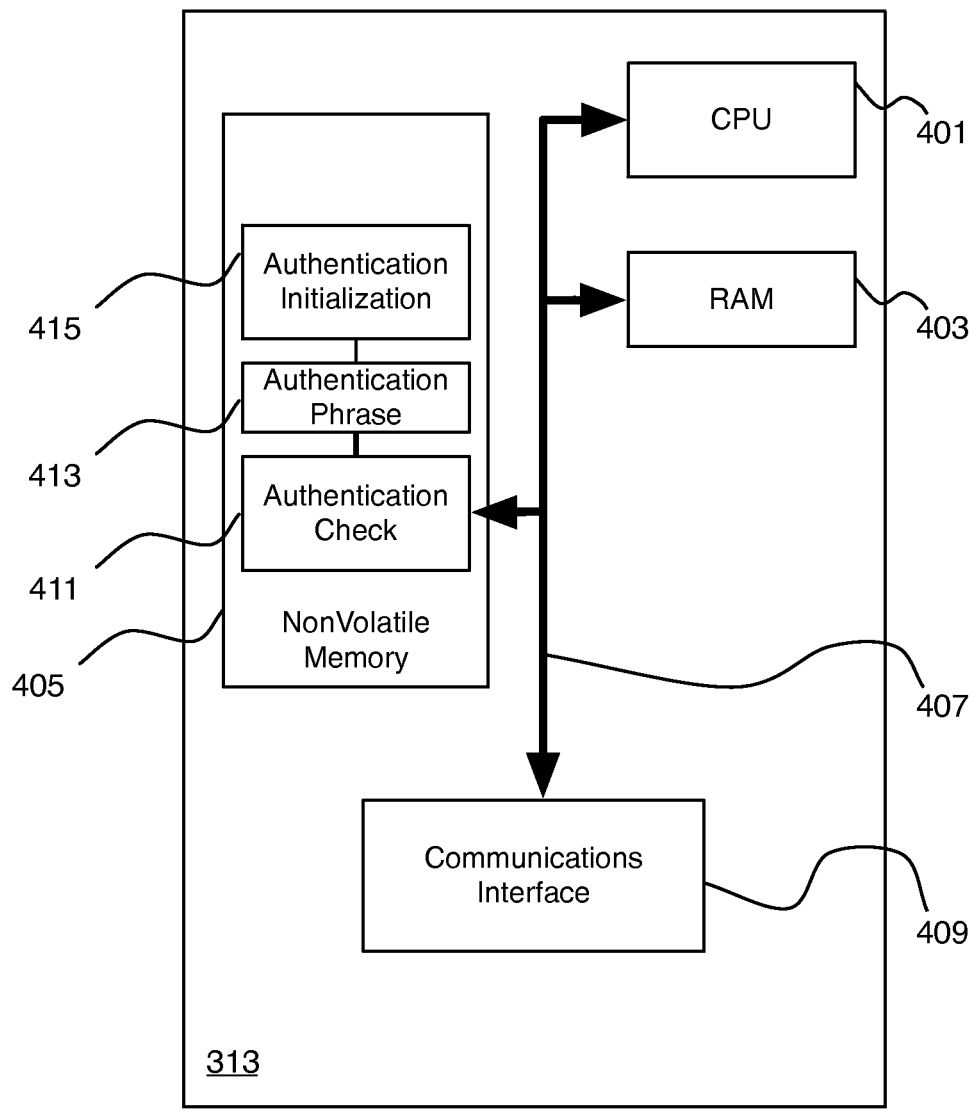
FIG. 4 is a block diagram providing a high-level view of the architecture of the smart card module of the secure flash drive of FIG. 3 including authentication modules that provide a role in authenticating a user for access to the secure flash drive.

Turning now to the architecture of the smart card module 313 which is illustrated in FIG. 4. The smart card module 313 contains a central processing unit (CPU) 401, a random access memory 403, a non-volatile memory (NVM) 405, a communications interface 409, and a bus 407 connecting these elements to one another.

The NVM 405 contains instructions for the CPU 401 such that when the CPU 401 executes these instructions it performs tasks specified by the instructions. The NVM 405, thus, contains programs for execution by the CPU 401, and may also contain non-volatile data. The NVM 405 contains, for example, the operating system for the smart card module 313. Furthermore, in one embodiment the NVM 405 contains an authentication check module 411. The authentication check module 411 causes the CPU 401 to verify whether candidate authentication credentials offered to the smart card module 313 over the communications interface 409 in an authentication dialog between the smart card module 313 and the host computer 105 correspond to a stored authentication phrase in a memory location for storing an authentication phrase 413.

The NVM 405 also contains an authentication initialization module 415 that operates to store a value in the memory location for storing the authentication phrase 413. The authentication phrase 413 may be given an initial value that is replaced during an initialization process as is described in greater detail herein below.

Figure 5:
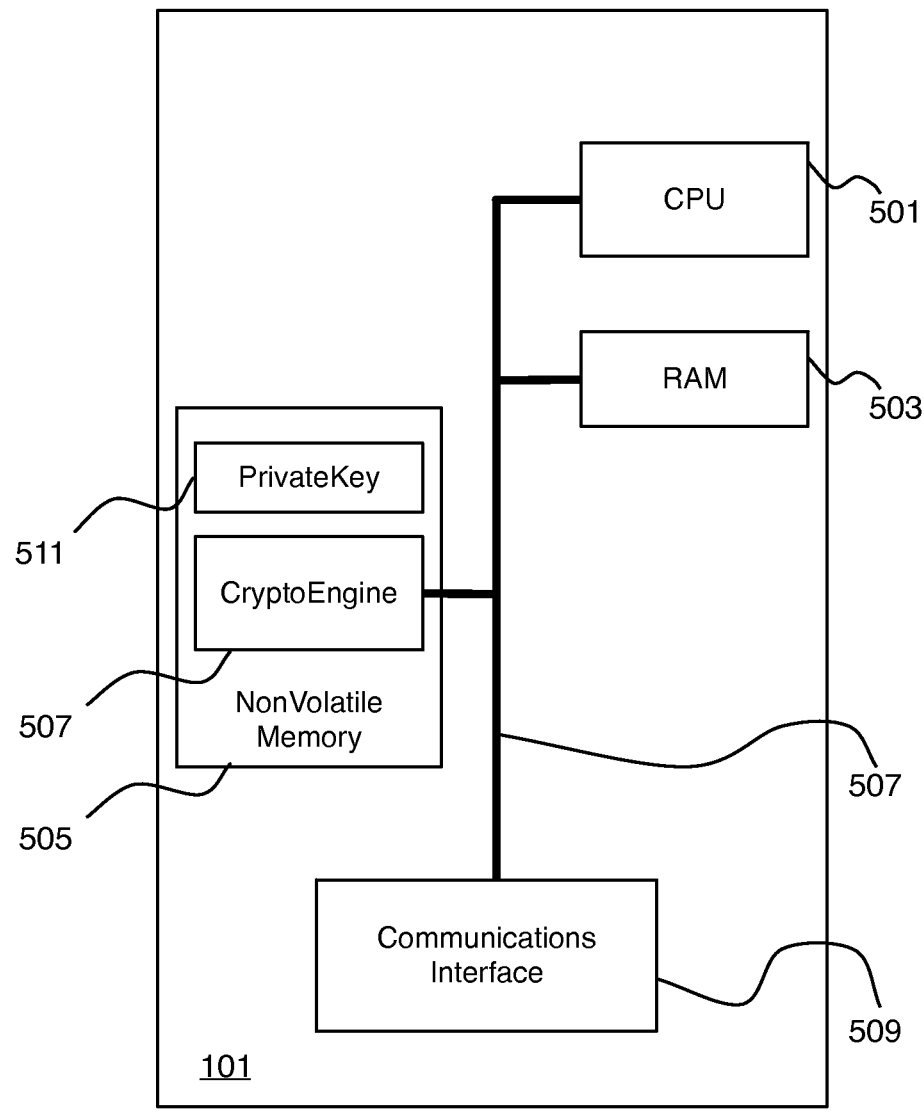
FIG. 5 is a block diagram providing a high-level view of the architecture of an embodiment of a second peripheral device connected to the host computer of FIG. 1, namely, a smart card that may be used to authenticate a user for use of the secure flash drive of FIG. 3.

Turning now to the architecture of the smart card 101 which is illustrated in FIG. 5. In the illustrated embodiment, the smart card 101 has a similar architecture to the smart card module 313. Like the smart card module 313, the smart card 101 contains a central processing unit (CPU) 501, a random access memory 503, a non-volatile memory (NVM) 505, a communications interface 509, and a bus 507 connecting these elements to one another.

The NVM 505 contains instructions for the CPU 501 such that when the CPU 501 executes these instructions it performs tasks specified by the instructions. The NVM 505, thus, contains programs for execution by the CPU 501, and may also contain non-volatile data. The NVM 505 contains, for example, the operating system for the smart card 101. Furthermore, the NVM 505 contains a cryptography engine 507. The cryptography engine 507 may, for example, contain instructions for signing a data item transmitted to the smart card 101 via the communications interface 509 from the host computer 105 using a private key, e.g., an RSA private key, stored in a memory location for storing a private key 511.

It must be noted that while herein above are described specific architectures for (1) a USB flash drive SC 103 and (2) a smart card 101, these are merely illustrative examples of two peripheral devices that may be used to execute the mechanisms for using authentication onto one peripheral device to provide authentication that also allows access to a second peripheral device described herein below. These mechanisms are described in conjunction with the timing sequence diagrams of FIGS. 6 and 7.

Figure 6:
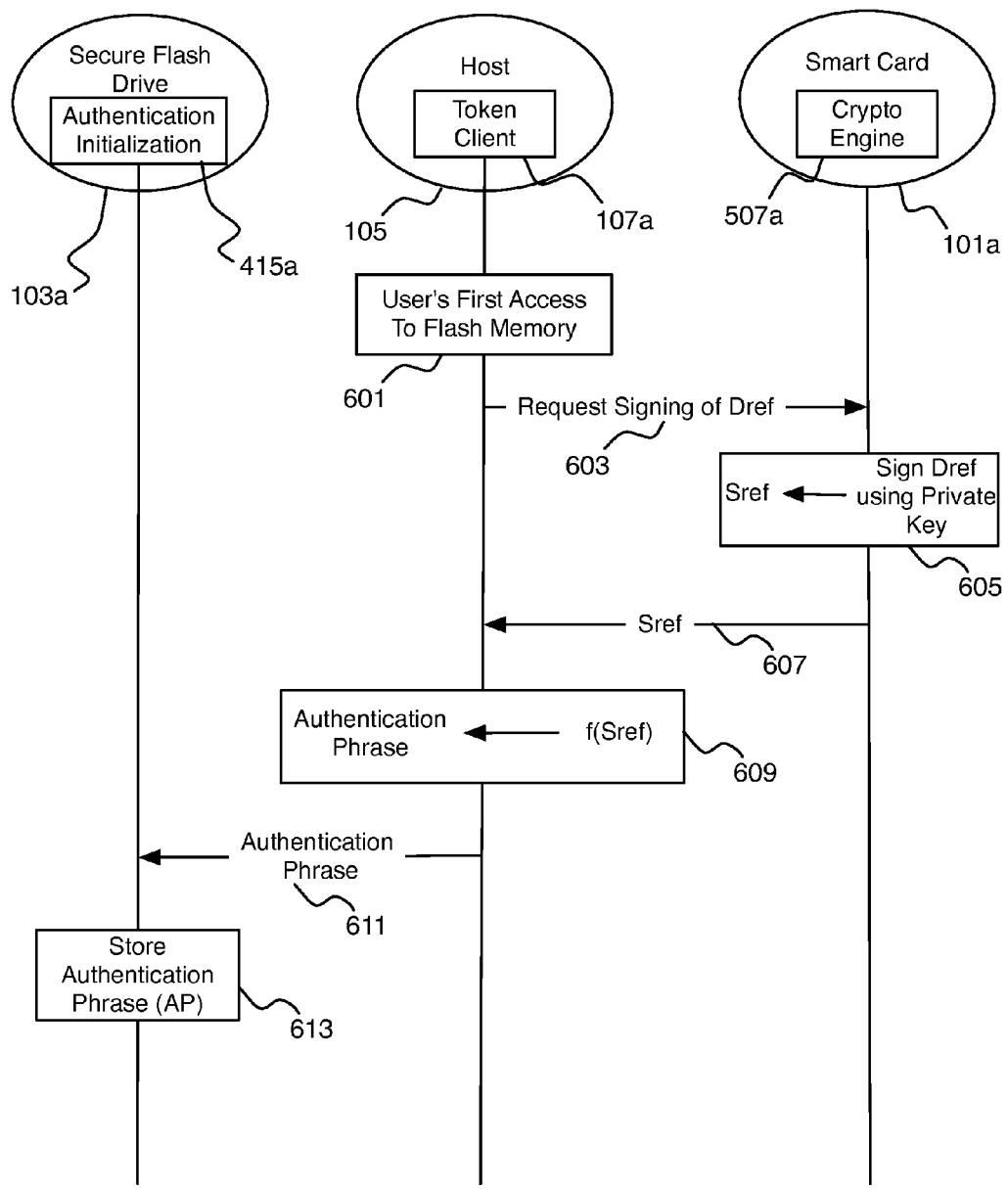
FIG. 6 is a timing sequence diagram illustrating the message flow between the secure flash drive, the host computer, and the smart card for initializing an authentication phrase according to a first embodiment.

FIG. 6 is a timing sequence diagram illustrating a mechanism for initializing the authentication phrase stored on the NVM 405 of a USB flash drive SC 103a. We assume here that the user has already been authenticated with the smart card 101a. However, in an alternative embodiment the next step (not shown here) would entail the user being authenticated with the smart card 101a. Such authentication may be in the form of being prompted for and entering a PIN, the correctness of which is verified by the smart card 101a.

Consider a user's first attempted use of the USB flash drive SC 103a, step 601. For example through a flag set in the USB flash drive SC 103a, the host becomes aware that the USB flash drive SC 103a has not previously been used by the user. The token client 107 uses a reference data item $D_{ref}$ 219 (FIG. 2). The host computer 105 transmits the reference data item $D_{ref}$ 219 to the smart card 101a with the request that the smart card 101a cryptographically signs the reference data item $D_{ref}$ 219, step 603. The smart card 101a then uses the private key 511 to cryptographically sign the reference data item $D_{ref}$ 219 to produce a reference data signature $S_{ref}$, step 605, using instructions of the cryptography engine 507a. The smart card 101a transmits the reference data signature $S_{ref}$ to the host computer 105, step 607. The token client 107a of the host 105 uses the reference data signature $S_{ref}$ to produce an authentication phrase, step 609. The host 105 sends the authentication phrase (AP) to the USB flash drive SC 103, step 611, and the USB flash drive SC 103a stores the authentication phrase in the memory location 413 for storing the authentication phrase, step 613. The token client 107a and the authentication initialization module 415a can use any agreed upon encrypted transfer mechanism so that the authentication phrase 611 is not transmitted in the clear.

In one embodiment the reference data item $D_{ref}$ 219 is computed using publicly available unique characteristics of the USB flash drive SC 103a combined with secret key known by the token client 107a. For example, the reference data item $D_{ref}$ 219 may be produced using the following equation:

$$D_{ref} = \text{HMAC-SHA256}(K_{s1}, \text{CardSerial})$$

where, CardSerial is the serial number of the smart card module 313 of the USB flash drive SC 103a, and $K_{s1}$ is a secret key within the token client 107a. HMAC-SHA256 is a well known cryptographic message authentication code. Any other message authentication function may be used as an alternative. Furthermore, in alternative embodiments both reference data item $D_{ref}$ 219 and secret key $K_{s1}$ may be stored values in the token client 107a or generated from other data items or by different formulae. An alternative to the card serial number is to use a unique identifier for the USB flash drive SC 103a.

The reference data signature $S_{ref}$ may then be converted into an authentication phrase using the following equations:

$$AP = \text{HMAC-SHA256}(K_{S3}, S')$$

where, $K_{S3}$ is a secret key used by the token client 107a and S' is computed using AES-256 encryption on $S_{ref}$ using a key $K_{aes}$, based on the following function:

$$S' = E_{aes}(K_{aes}, S_{ref})$$

where, $S_{ref}$ is the reference data signature $S_{ref}$ obtained from the smart card 101a in step 605, and $K_{aes}$ is an AES 256-bit key computed from:

$$K_{aes} = \text{HMAC-SHA256}(K_{S2}, \text{CardSerial})$$

where, CardSerial is the serial number of the smart card module 313 of the USB flash drive SC 103a, and $K_{s2}$ is a secret key known by the token client 107a.

While a specific set of equations are described herein above for computing reference data item $D_{ref}$ 219, the reference data signature $S_{ref}$, and AP these equations are merely examples used in one embodiment. Any alternative approach for computing a reference data, providing a unique signature of that reference data, and converting that reference signature to an authentication phrase may be used to produce the same overall result.

Figure 7:
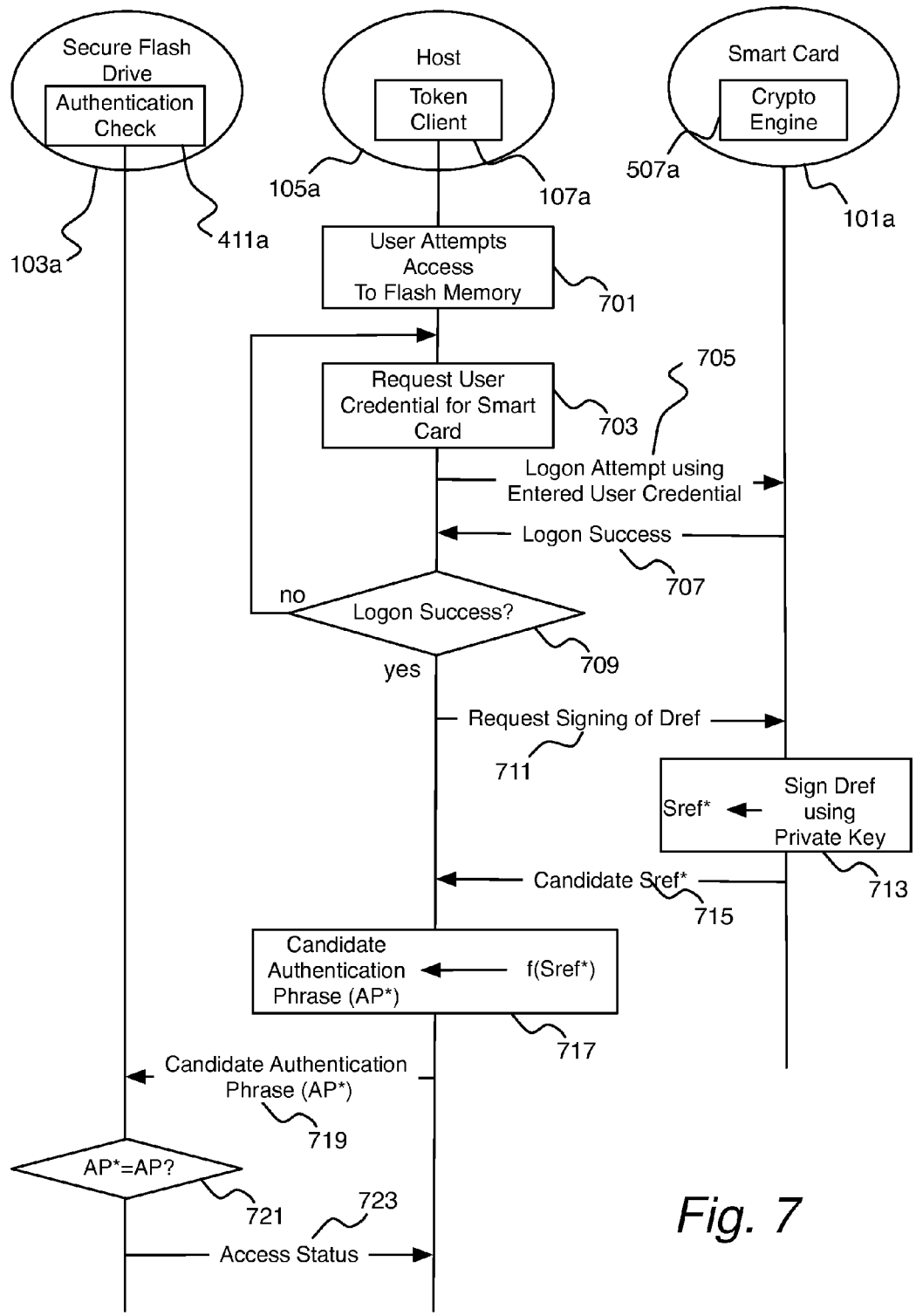
FIG. 7 is a timing sequence diagram illustrating the message flow between the secure flash drive, the host computer, and the smart card for providing authentication on subsequent access to the secure flash drive initialized as set forth in FIG. 6.

Turning now to subsequent use of the USB flash drive SC 103a which is illustrated in the timing-sequence diagram of FIG. 7. A user attempts to access the USB flash drive SC 103a, step 701, for example, to write or read data thereon. The token client 107a executing on the host computer 105, requires the user to log on to the smart card 101a if the user has not already been authenticated for using the smart card 101a, steps 703 through 709. If the user fails to successfully log in, step 709, the login process may be repeated. Otherwise, if the user has logged in correctly to the smart card 101a, the token client 107a requests the smart card 101a to sign the reference data item $D_{ref}$ 219, step 711.

The smart card 101a, using the cryptography engine 507, signs the reference data item $D_{ref}$ 219 thereby producing a candidate reference data signature $S_{ref}*$, step 713. The smart card 101a transmits the candidate reference data signature $S_{ref}*$ to the host computer 105, step 715.

The token client 107a converts the candidate reference data signature $S_{ref}*$ into a candidate authentication phrase AP*, step 717. The token client 107a uses the same method for converting a reference data signature $S_{ref}$ as used to create the authentication phrase AP in step 609 of FIG. 6. The candidate authentication phrase AP* is transmitted by the token client 107a to the USB flash drive SC 103a, step 719.

USB flash drive SC 103a using the authentication check module 411 checks the candidate authentication phrase AP* against the stored authentication phrase AP 413, step 721, and communicates back the access status, e.g., access granted or access denied, to the host computer 105, step 723. The authentication check 721 should only succeed if the smart card 101a used to logging in is the same as the smart card 101a used to initialized the authentication phrase 413. The authentication success also requires that the token client 107a is authentic and the USB flash drive SC 103a has a non-zero authentication phrase try counter.

Thus, the authentication phrase initialization procedure of FIG. 6 and the login procedure of FIG. 7 provides a mechanism by which authorization to use the smart card 101a may operate to authorize the user to also use the USB flash drive SC 103a.

Figure 8:
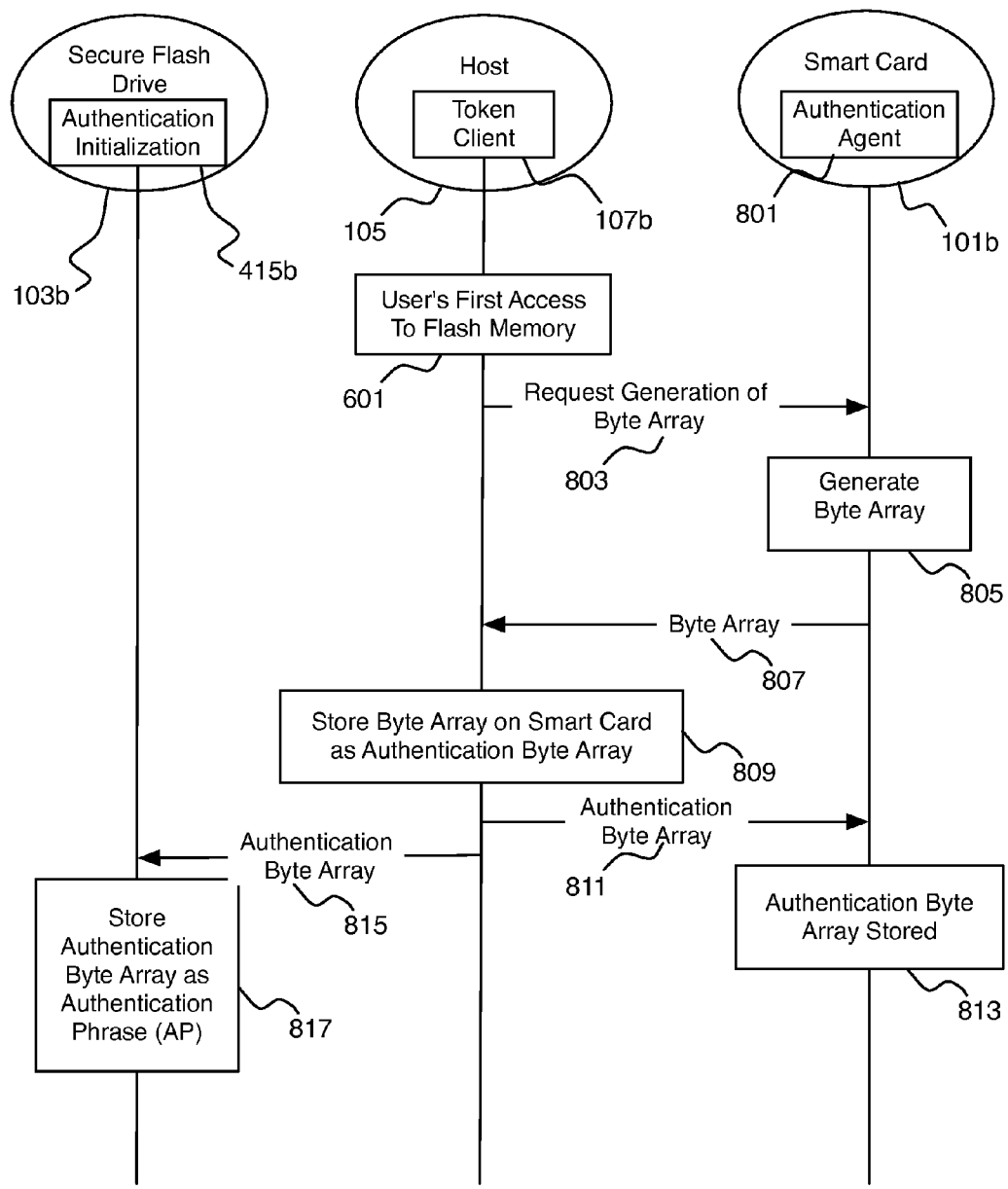
FIG. 8 is a timing sequence diagram illustrating the message flow between the secure flash drive, the host computer, and the smart card for initializing an authentication phrase according to a second embodiment.
Figure 9:
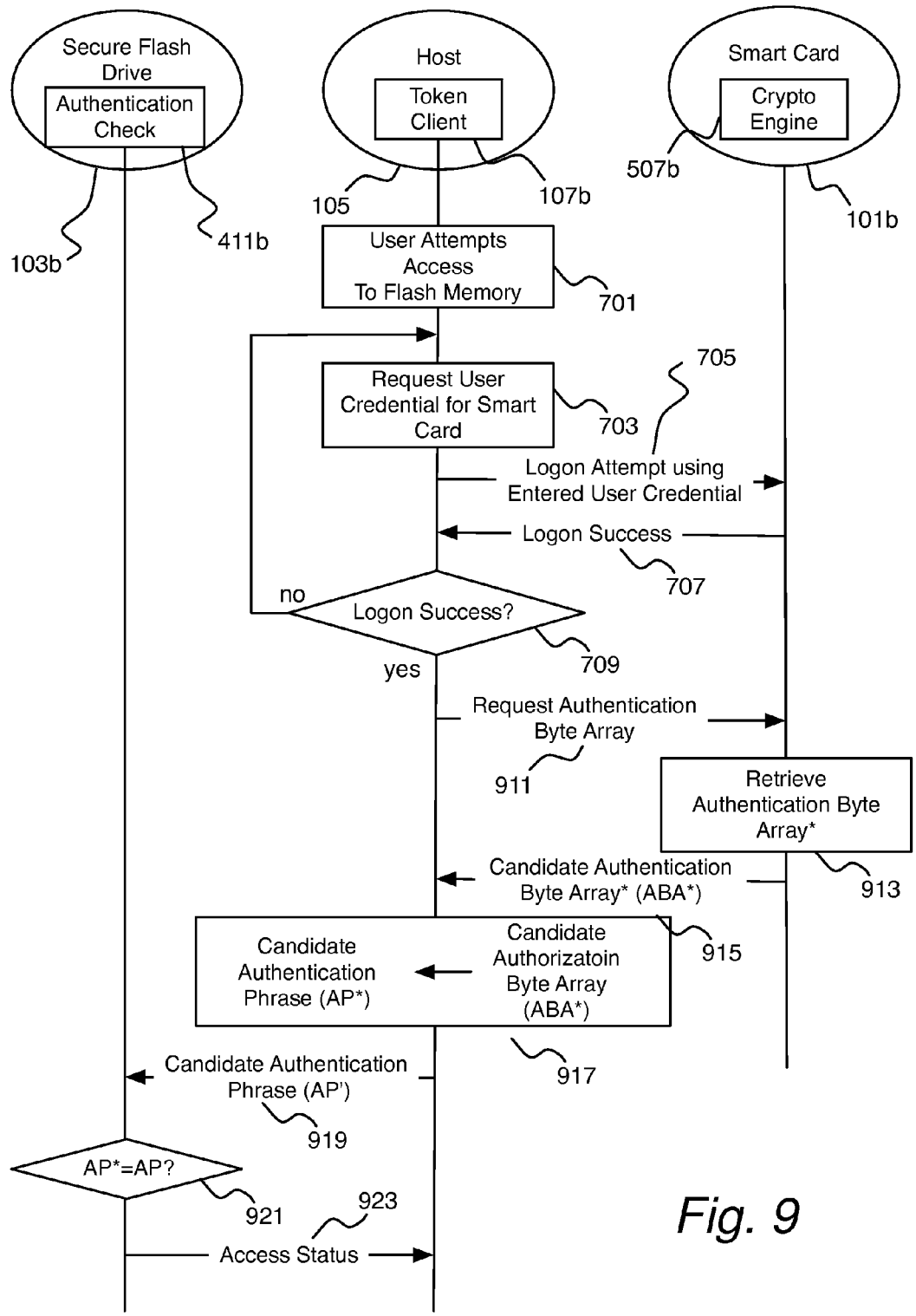
FIG. 9 is a timing sequence diagram illustrating the message flow between the secure flash drive, the host computer, and the smart card for providing authentication on subsequent access to the secure flash drive initialized as set forth in FIG. 8.

In an alternative embodiment, illustrated in the timing-sequence diagrams of FIGS. 8 and 9, the smart card 101b is called upon to generate a byte array that serves as authentication phrase for the USB flash drive SC 103b. Upon the first attempted access of the USB flash drive SC 103b by the user, step 601, the smart card 101b is called upon to generate a byte array, step 805, for example, a sixteen-byte long array. An authentication agent 801 of the smart card 101b generates the byte array, for example, by using a true random number generator in the smart card 101b crypto engine 507, or a signature (using a private key inside the smart card 101b) of a serial number or other identifier inside the smart card 101b. As in the previous embodiment, it is assumed here that the user has already been authenticated for using the smart card 101b. The smart card 101b returns the byte array to the host computer 105, step 807. The token client 107b of the host computer 105 then stores the byte array back onto the smart card 101b as the authentication byte array in a file for exclusive use by the user (i.e., only available after the user has been authenticated), steps 809 and 811. The authentication byte array is stored on the smart card 101b, step 813, in a manner such that it can only be retrieved by an authenticated user.

The byte array is also transmitted to the USB flash drive SC 103b, step 815. The USB flash drive SC 103b stores the authentication byte array as the accepted authentication phrase AP 413, step 817. In an alternative embodiment, the authentication agent 801 converts the byte array into an authentication phrase in a manner similar as that discussed herein above in conjunction with FIG. 6.

In the subsequent use of a USB flash drive SC 103b, triggered by a user's attempted use of the USB flash drive SC 103b, illustrated in the timing sequence diagram of FIG. 9, the initial steps of logging in to the smart card 101b is as illustrated and discussed in conjunction with the login procedure discussed vis-à-vis smart card 101a of FIG. 7. After the user's successful log in to the smart card 101b, the token client 107b of the host computer 105 requests the smart card 101b to return the authentication byte array stored in step 813 of FIG. 8, step 911, as the candidate authentication byte array (ABA*). The smart card 101b retrieves the stored authentication byte array, step 913, and transmits it to the host computer 105. The token client 107b of the host computer 105 treats the candidate authentication byte array (ABA*) as the candidate authentication phrase (AP*) for securing access to the USB flash drive SC 103b, step 917. The token client 107b then sends the candidate authentication phrase AP* to the USB flash drive SC 103b, step 919.

USB flash drive SC 103b using the Authentication Check module 411b checks the candidate authentication phrase AP* against the stored authentication phrase AP 413, step 921, and communicates back the access status, e.g., access granted or access denied, to the host computer 105, step 923. The authentication check 921 should only succeed if the smart card 101b used to logging in is the same as the smart card 101b used to initialized the authentication phrase 413. The authentication success also requires that the token client 107b is authentic and the USB flash drive SC 103b has a non-zero authentication phrase try counter.

Figure 10:
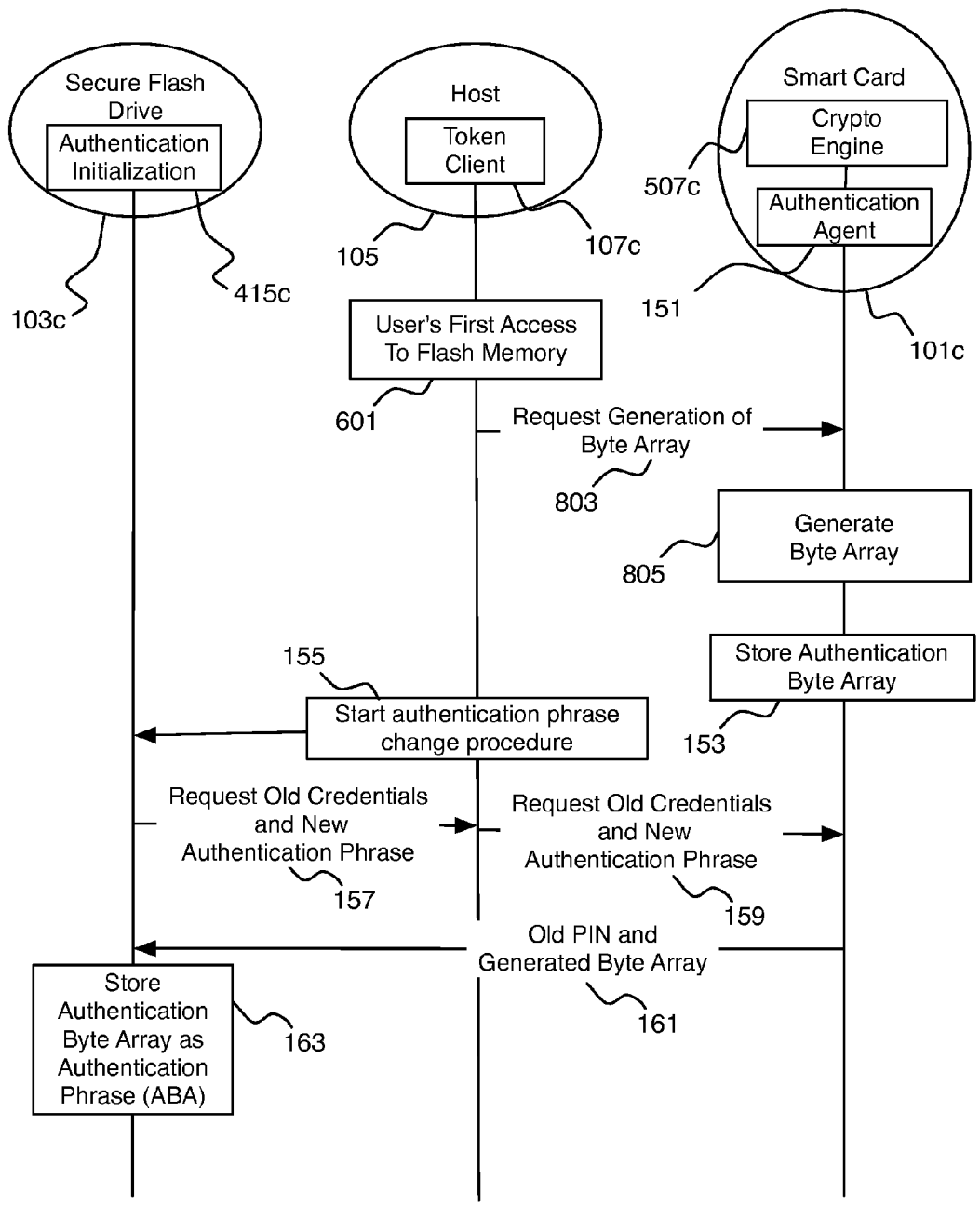
FIG. 10 is a timing sequence diagram illustrating the message flow between the secure flash drive, the host computer, and the smart card for initializing an authentication phrase according to a third embodiment.
Figure 11:
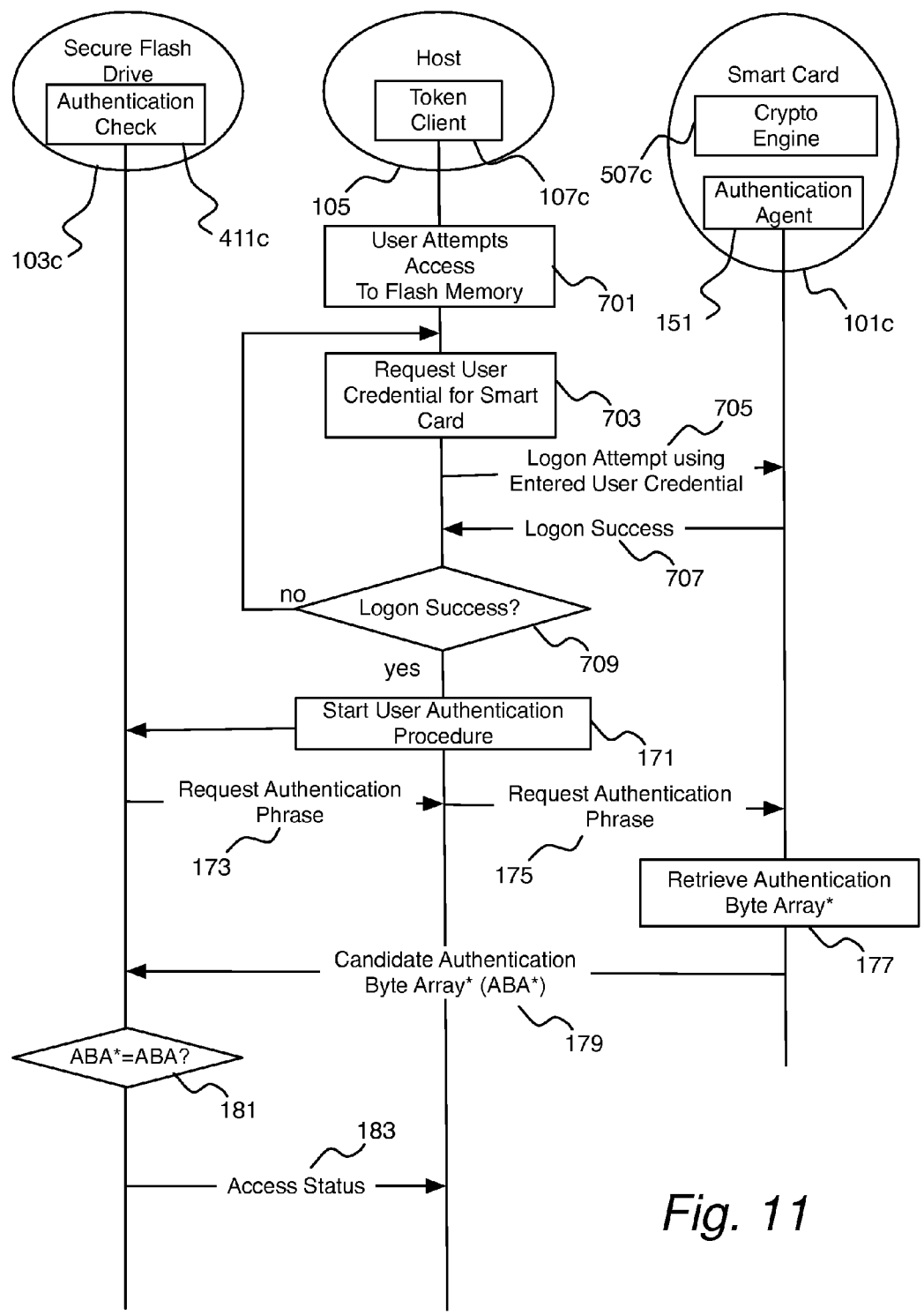
FIG. 11 is a timing sequence diagram illustrating the message flow between the secure flash drive, the host computer, and the smart card for providing authentication on subsequent access to the secure flash drive initialized as set forth in FIG. 10.

In an alternative embodiment, illustrated in the timing-sequence diagrams of FIGS. 10 and 11, the smart card 101c is modified to include a custom authentication agent 151 called upon to generate a byte array that serves as authentication phrase for a USB flash drive SC 103c. In this alternative embodiment, the authentication challenge-response dialog is carried out between the USB flash drive SC 103c executing an authentication initialization module 415c and an authentication check module 411c (FIG. 11), with the token client 107c executing on the host computer 105 primarily serving as a pass-through module. The authentication phrase 413 is generated on the smart card 101c and is only transmitted in encrypted form to the USB flash drive SC 103c.

Turning first to the initialization of the authentication phrase 413 which is illustrated in the timing-sequence diagram of FIG. 10. As with the previous examples, it is assumed for this discussion that the user has been authenticated to use the smart card 101c. As in the embodiment illustrated in FIGS. 8 and 9, the user's first access to the flash memory, step 601, triggers a request to generate a byte array, step 803. The request is processed by the authentication agent 151 to generate the byte array, step 805. The method for generating the byte array may be as set forth herein above or any other algorithm for producing a secure byte array. Unlike the previously described embodiment (FIGS. 8 and 9), the byte array is not transmitted (at this point in the process) back to the token client 107c executing on the host computer 105. Rather, the generated byte array is stored directly on smart card 101c by the authentication agent 151, step 153.

The host computer 105 next starts an authentication change procedure, step 155, by messaging the USB flash drive SC 103c. In response, the USB flash drive SC 103c responds with a request for current (OLD) login credentials and a new authentication phrase, step 157. The "old" credentials may be a factory default value for a PIN granting only initialization access to the USB flash drive SC 103c. The host computer 105 token client 107c merely passes the request on to the smart card 101c, step 159.

The authentication agent 151 of the smart card 101c responds with the "old" default PIN, which may be hardcoded in the smart card 101c, and the generated byte array, step 161. The token client 107 simply passes these through to the USB flash drive SC 103c. The authentication initialization module 415c stores the received byte array in the authentication phrase (AP) memory location 413. The "request for Old credentials and new authentication phrase" (steps 157 and 159) and the "Old PIN and generated byte array" (step 161) do not necessarily transmit the credential values in the clear, i.e., without encryption. The authentication agent 151 and the USB flash drive SC 103c can use any agreed upon challenge-response mechanism to exchange data. For example, the authentication initialization module 415c could generate a random 8-byte challenge. The authentication agent 151 could generate a response by encrypting (using AES, 3-DES or any other symmetric algorithm) the 8-byte challenge using the Old credential as the key. The authentication agent 151 can also encrypt the new authentication phrase with the same key value. Such a mechanism prevents eavesdropping of data while the data is being transmitted from smart card 101c to USB flash drive SC 103c. Other similar challenge-response techniques can also be used.

In the subsequent use of a USB flash drive SC 103c, triggered by a user's attempted use of the USB flash drive SC 103c, illustrated in the timing sequence diagram of FIG. 11, the initial steps of logging in to the smart card 101c is as illustrated and discussed in conjunction with the login procedure discussed vis-à-vis smart card 101a of FIG. 7. After the user's successful log in to the smart card 101c, the token client 107c of the host computer 105 initiates a user authentication procedure to login the user to the USB flash drive SC 103c, step 171.

The authentication check module 411c of the USB flash drive SC 103c responds with a request for the authentication phrase, step 173. The token client 107c passes that request on to the smart card 101c, step 175. The authentication agent 151 of the smart card 101c retrieves the authentication byte array stored in step 153, step 177, and responds, via pass-through by token client 107c, to the USB flash drive SC 103c with that as an candidate authentication byte array (ABA*), step 179.

USB flash drive SC 103c using the Authentication Check module 411c checks the candidate authentication byte array ABA* against the stored authentication byte array ABA 413, step 181, and communicates back the access status, e.g., access granted or access denied, to the host computer 105, step 183. The authentication check 181 should only succeed if the smart card 101c used to logging in is the same as the smart card 101c used to initialized the authentication phrase 413. The authentication success also requires that the token client 107c is authentic and the USB flash drive SC 103c has a non-zero authentication phrase try counter.

Figure 12:
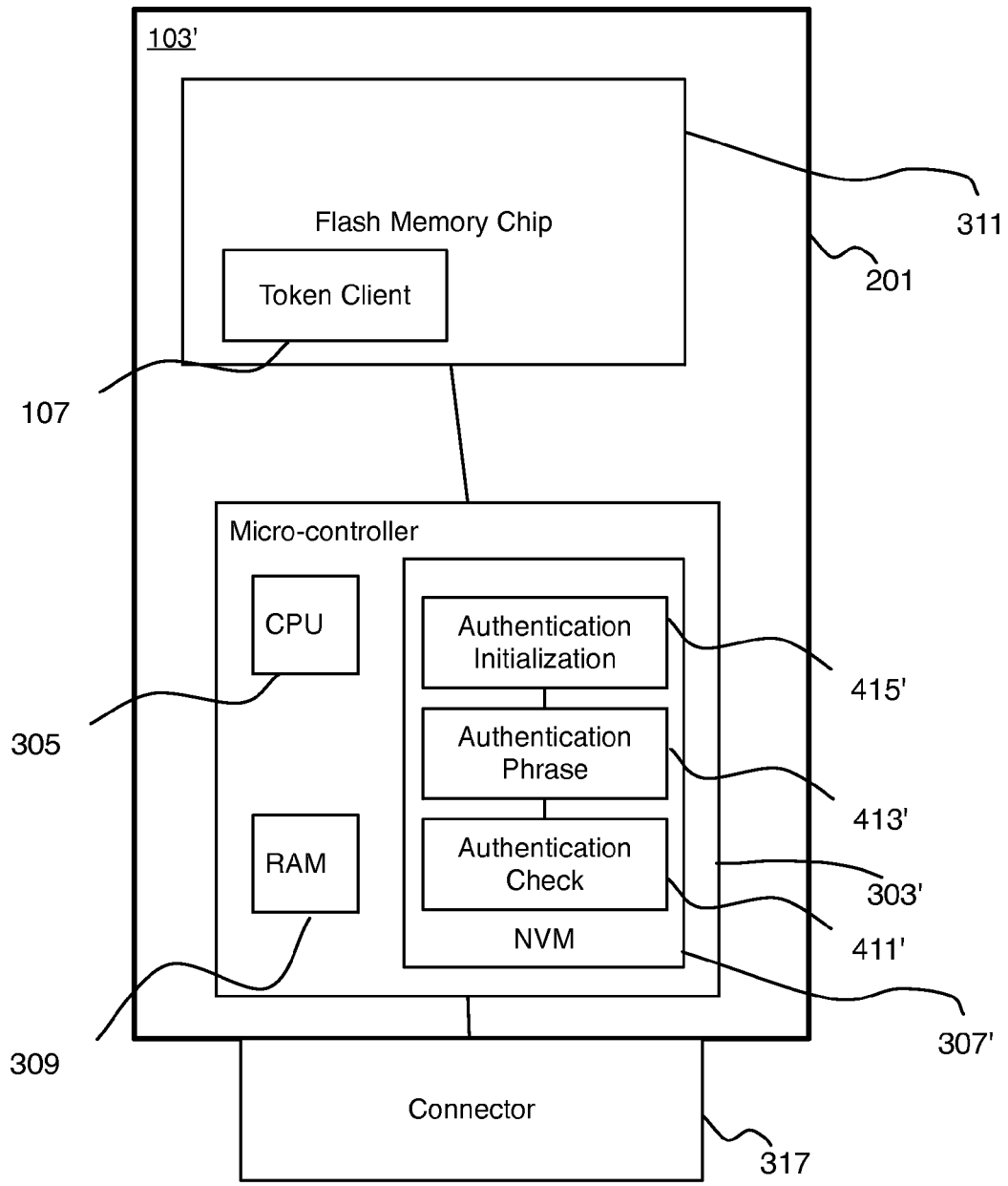
FIG. 12 provides a high-level block diagram illustrating an alternative embodiment to the secure flash drive of FIGS. 3 and 4 that may provide the functionality illustrated in FIGS. 9 through 11.

FIG. 12 provides a high-level block diagram illustrating an alternative embodiment for a secure flash drive 103'. In this alternative embodiment, contrasted to USB flash drive SC 103 of FIGS. 3 and 4, does not contain a smart card module. Rather the challenge-response mechanisms described herein above, for example, in conjunction with FIGS. 6 through 11, are performed directly by the micro-controller 303' of the flash drive 103'. To provide the herein above described functionality, the tasks of initializing an authentication phrase 413' is performed using an authentication initialization module 415' located in the NVM 307'. Similarly the authentication check module 411' is also located in the NVM 307'. However, the functionality performed is otherwise like that discussed in conjunction with FIGS. 6 through 11 and elsewhere herein.

Figure 13:
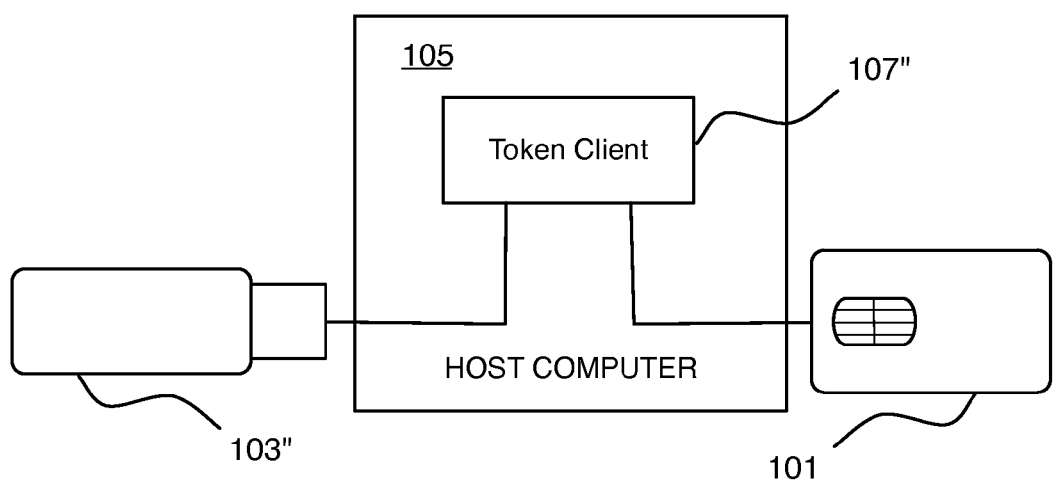
FIG. 13 is a high-level diagram illustrating an alternative embodiment in which a non-secure flash drive is connected to a host computer.

In yet another alternative embodiment, the above-described mechanism, with slight modification, is used to protect access to data stored on a flash drive 103" that lacks all form of security mechanisms in its firmware. FIG. 13 is a high-level diagram illustrating the non-secure flash drive 103" connected to a host computer 105. The host computer 105 is also connected to a smart card 101 which provides the same security functions as described herein above. A token client 107" marshals the interaction of a user with the non-secure flash drive 103".

Figure 14:
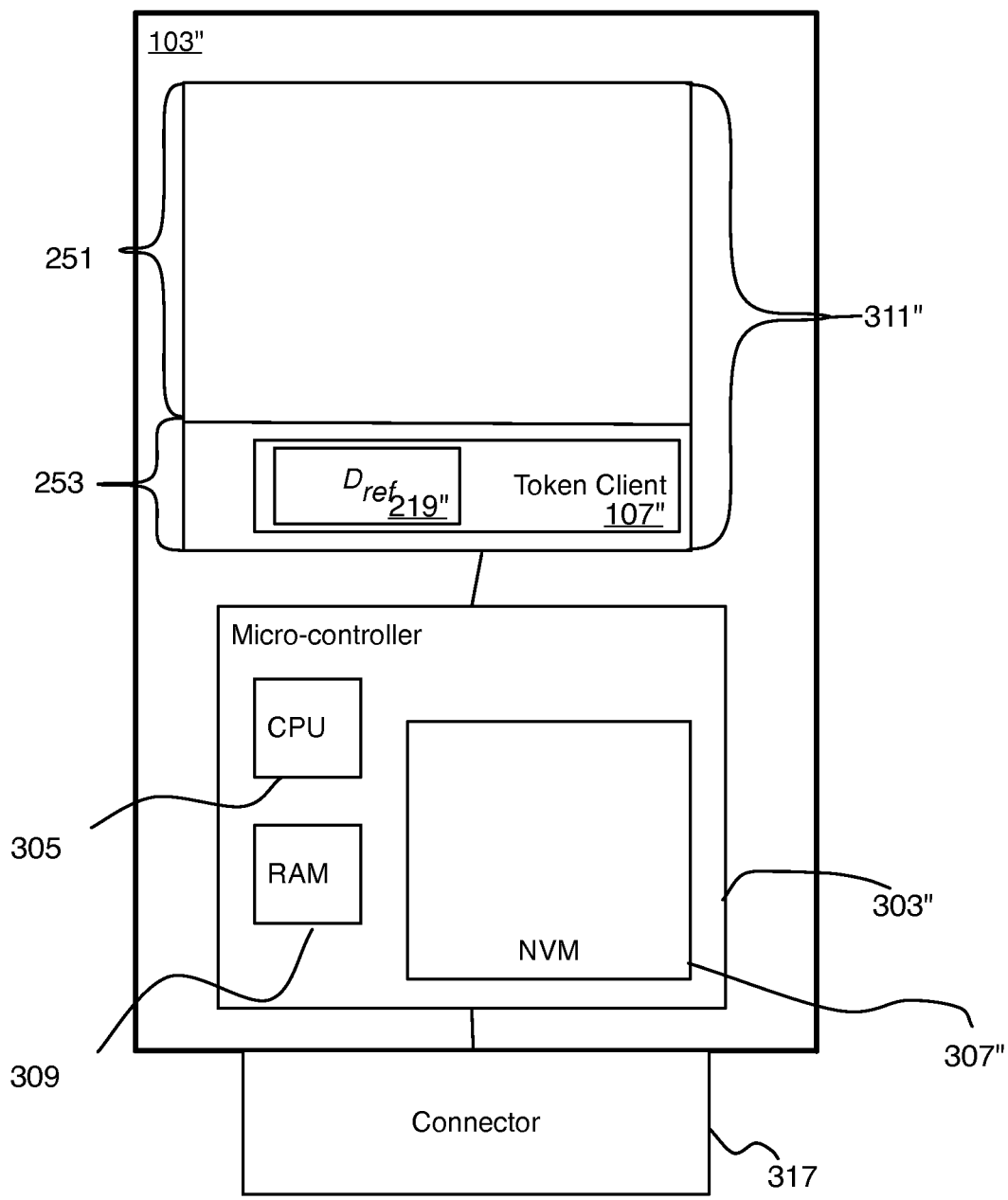
FIG. 14 is a high-level block diagram illustrating the architecture of the non-secure flash drive employed in the embodiment of FIG. 13.

FIG. 14 is a high-level block diagram illustrating the architecture of the non-secure flash drive 103". A flash memory 311" is partitioned into an encrypted data file 251 and a not protected area 253. The not protected area 253 contains the token client 107" and a reference data item $D_{ref}$ 219" in the token client 107" (or some equivalent thereto such as information from which a reference data item $D_{ref}$ 219" may be computed, e.g., a device serial number). The reference data item $D_{ref}$ 219" is not necessarily static but may be computed from some secret data inside the token client 107" and some unique characteristic of the flash drive 103" in a manner similar to that described in the embodiment of FIG. 6.

Figure 15:
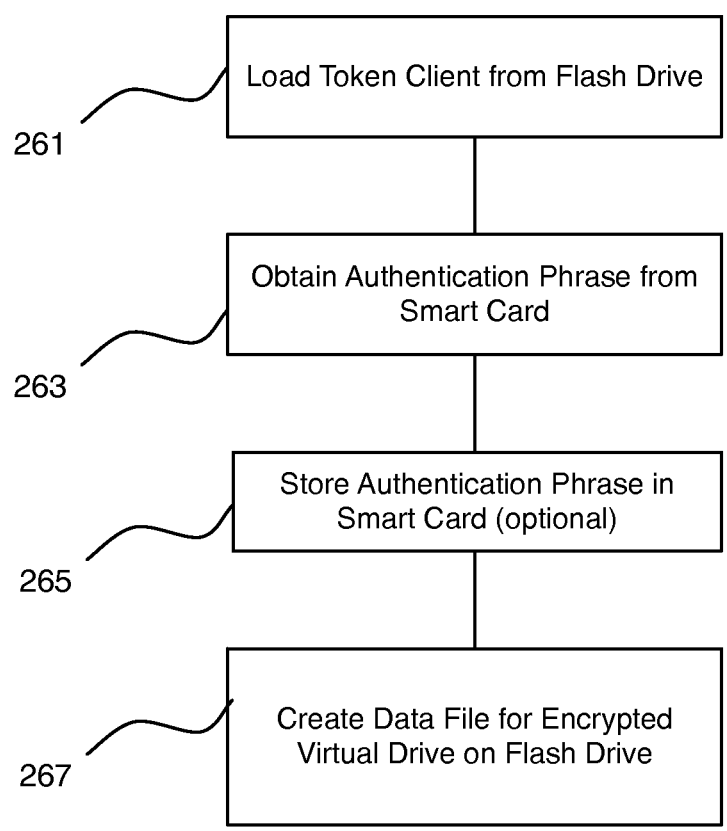
FIG. 15 is a flow-chart illustrating a process executed by the host computer to initialize the flash drive according to the alternative embodiment in which a non-secure flash drive is connected to a host computer.

FIG. 15 is a flow-chart illustrating the process executed by the host computer 105 to initialize the flash drive 103". In a first step the host computer 105 loads the token client 107", step 261. In one embodiment, the token client 107" is loaded from the flash drive 103". However, the technique described herein is useful with any non-secure flash drive 103" and, thus, the flash drive 103" may not include a token client 107" in which case the token client 107" may be downloaded from an external source, e.g., over the Internet.

Next the host computer 105 causes the user to authenticate with the smart card 101 and to go through the steps of creating an authentication phrase (AP) for use with the flash drive 103", step 263. The mechanism by which the authentication phrase (AP) is obtained may follow any of the hereinabove-provided examples, e.g., by requesting the smart card 101 to sign the reference data item $D_{ref}$ 219 or operating the smart card 101 to generate a byte array.

The authentication phrase is optionally stored on the smart card, step 265, either indirectly in the manner of the embodiment of FIG. 8 or directly using a custom agent in the manner of FIG. 10. If the authentication phrase is obtained as in the embodiment of FIGS. 6 and 7, the authentication phrase is a signature of the reference data item $D_{ref}$ 219" and is not stored.

Next the token client 107" is used by the host computer 105 to create a datafile 251 in the flash memory 311", step 267. The datafile 251 is used as an encrypted virtual drive, for example, in the manner of PGPdisk of the PGP Corporation, Menlo Park, Calif. The datafile 251 is format as necessary to have it recognized as an encrypted virtual drive by a program such as PGPdisk. In another alternative, the data file may be created through the secure folder approach in the manner used by the SecureFlash software solution of Encryptx Corporation (A BeCompliant Company) Broomfield, Colo.

Figure 16:
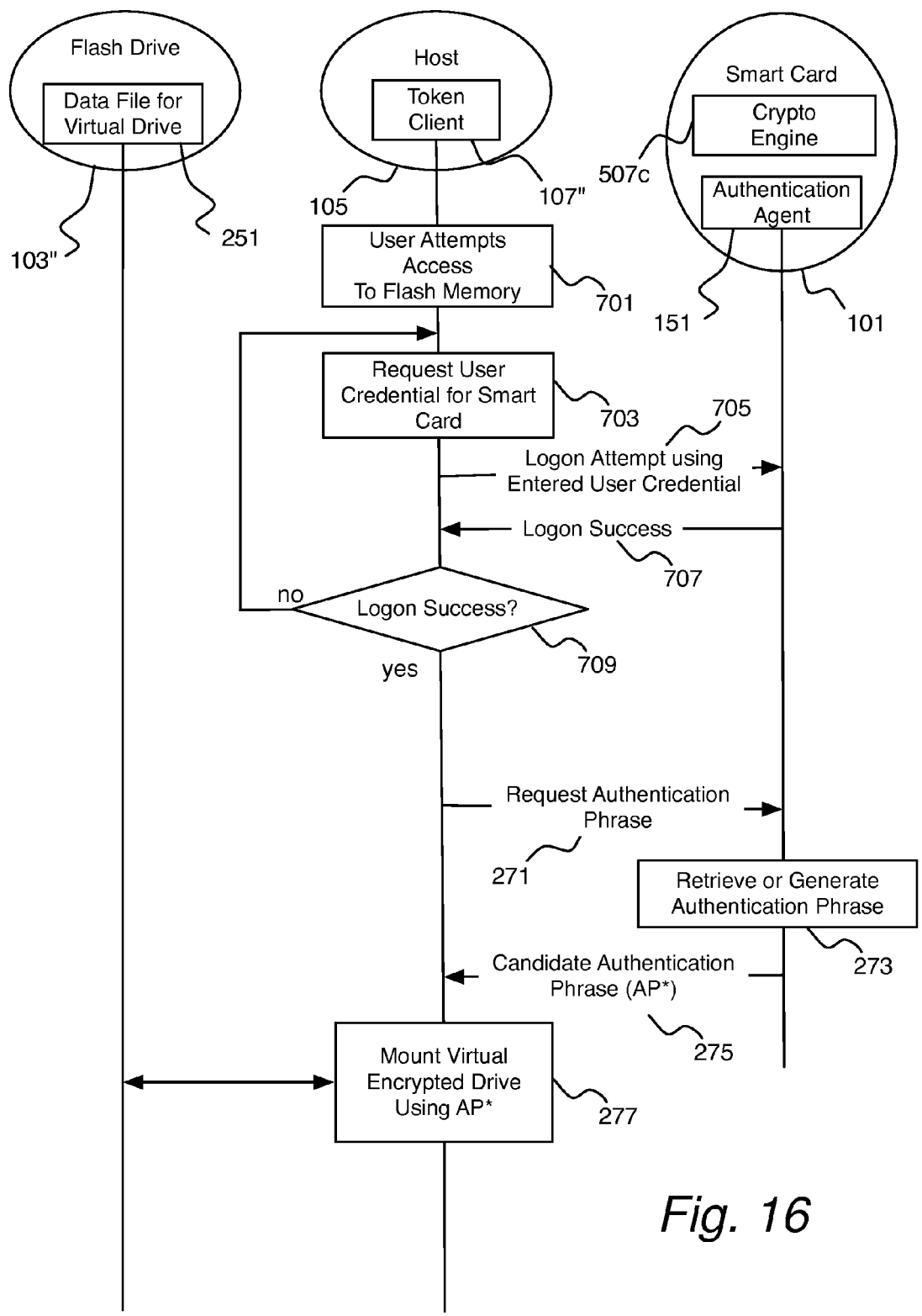
FIG. 16 is a timing sequence diagram illustrating the operation of the host computer of FIG. 13 in conjunction with the non-secure flash drive and a smart card to access a datafile as an encrypted virtual drive.

FIG. 16 is a timing sequence diagram illustrating the operation of the host computer 105 in conjunction with the non-secure flash drive 103" and a smart card 101 to access the datafile 251 as an encrypted virtual drive. A user goes through the same authentication sequence 703 through 709 to authenticate with the smart card 101 upon attempting access to the flash drive 103", step 701. Upon successful authentication to the smart card 101, the token client 107" requests the authentication phrase from the smart card 101, step 271. The smart card 101 retrieves the candidate authentication phrase (AP*) from the location at which the smart card 101 stored the authentication phrase in step 263 or generates the candidate authentication phrase AP* as a signature of the reference data item $D_{ref}$ 219", step 273, and returns the candidate authentication phrase AP* to the token client 107", step 275.

The token client 107" mounts the data file 251 as a virtual encrypted drive using the candidate authentication phrase AP* obtained from the smart card 101, step 277. The mounting of the data file 251 should only be successful if the same smart card 101 is used to access the data file 251 as the smart card 101 that was used to create the authentication phrase AP when the non-secure flash drive 103" was initialized using the procedure of FIG. 15.

From the foregoing it will be apparent that a secure mechanism has been described herein which allows a user to log in on one secure peripheral device and have that authentication also allow access to a second peripheral thereby providing heightened security for access to the second peripheral device while saving the user the trouble of remembering a separate authentication phrase for the second device.

While the above description that includes preferred embodiments rely on flash memory devices and smart cards, the techniques described herein are equally applicable to other peripheral devices that require authentication prior to allowing access thereto. Authentication phrase may mean mechanism used for determining the knowledge of something required to gain access to the device. Examples include PINs, passwords, username-password combinations.

Although specific embodiments of the invention have been described and illustrated, the invention is not to be limited to the specific forms or arrangements of parts so described and illustrated. The invention is limited only by the claims.

We claim:

1. A method for providing authentication of a user to a first peripheral device connected to a host computer using an authentication of the user on an independently connected second peripheral device also connected to the host computer, allowing the user access to both devices through a single authentication, comprising:

operating the host computer to detect that the user is attempting use of the first peripheral device;

operating the second peripheral device to cause the user to authenticate to the second peripheral device;

operating the host computer to cause the second peripheral device which is independently connected to the host computer to execute a security function that utilizes a unique characteristic of the second peripheral device to produce a result that uniquely links the first peripheral device to the second peripheral device and that ensures that the first peripheral device cannot be accessed without authentication via the second peripheral device, and the result of which may be used by the host computer to compute an authentication phrase that may be validated by the first peripheral device as a credential allowing access to the first peripheral device conditioned upon the presence of and successful authentication to the second peripheral device;

operating the host computer to calculate the authentication phrase based on the result of the security function returned from the second peripheral device;

transmitting the authentication phrase from the host computer to the first peripheral device;

operating the first peripheral device to allow the user access to private assets stored on the first peripheral device only upon positive determination by the first peripheral device that the user has been authenticated based on verification of the authentication phrase as corresponding to an accepted authentication phrase.

2. The method for providing authentication of a user to a first peripheral device of claim 1 wherein the security function is a cryptographic signature of a reference data.

3. The method for providing authentication of a user to a first peripheral device of claim 1 further comprising a linking step:

operating the host computer to:

request the second peripheral device to cryptographically sign a specified reference data;
convert the resulting signature into an authentication phrase for the first peripheral device; and
transmit the authentication phrase to become the accepted authentication phrase for the first peripheral device; and
operating the first peripheral device to store the accepted authentication phrase thereby uniquely linking the first peripheral device to the second peripheral device.

4. The method for providing authentication of a user to a first peripheral device of claim 1 wherein the security function is performing a cryptographic signature on a reference data and the step of using the security function to determine whether the user has been authenticated by the second peripheral device comprises:
operating the host computer to request the second peripheral device to sign and return the reference data; and
operating the host computer to convert the reference data signature received from the second peripheral device into an authentication phrase for the first peripheral device and having the first peripheral device allow or disallow access to the private assets stored thereon based on whether the authentication phrase matches a known authentication phrase.

5. The method for providing authentication of a user to a first peripheral device of claim 1 wherein the security function is a request to the second peripheral device to generate a byte array and the method further comprising:
generating the byte array on the second peripheral device; and
storing the byte array on the first peripheral device thereby uniquely linking the first peripheral device to the second peripheral device.

6. The method for providing authentication of a user to a first peripheral device of claim 5 further comprising storing the generated byte array on the second peripheral device.

7. The method for providing authentication of a user to a first peripheral device of claim 5 further comprising:
upon an attempted access to the first peripheral device, requesting a candidate authentication byte array from the second peripheral device; and
allowing access to the first peripheral device if the candidate authentication byte array corresponds to the stored generated authentication byte array thereby demonstrating presence of and successful authentication to second peripheral device.

8. The method for providing authentication of a user to a first peripheral device of claim 1 further comprising:
storing an authentication agent on the second peripheral device;
operating the authentication agent to generate a byte array on the second peripheral device;
transmitting the generated byte array from the second peripheral device to an authentication initialization module on the first peripheral device; and
storing the generated byte array on the first peripheral device thereby uniquely linking the first peripheral device to the second peripheral device.

9. The method for providing authentication of a user to a first peripheral device of claim 8 further comprising:
upon an attempt to access the first peripheral device, operating the first peripheral device to send a request for an authentication phrase directly to authentication agent executing on the second peripheral device;
operating the second peripheral device to retrieve the authentication phrase and to transmit the retrieved authentication phrase as a candidate authentication phrase to the first peripheral device; and
allowing access to the first peripheral device if the candidate authentication phrase matches the authentication phrase stored on the first peripheral device thereby demonstrating presence of and successful authentication to second peripheral device.

10. A method for providing authentication of a user to a first peripheral device connected to a host computer using an authentication of the user on a second peripheral device also connected to the host computer, allowing the user access to both devices through a single authentication, comprising:
upon an attempt to establish a connection to the first peripheral device through the host computer, operating the host computer:
to request the user to commence an authentication process for the second peripheral device;
to attempt to authenticate the user to the second peripheral device;
upon successful authentication to the second peripheral device, to request the second peripheral device to execute a security function designated by the host computer and that utilizes a unique characteristic of the second peripheral device to produce a result that uniquely links the first peripheral device to the second peripheral device and that ensures that the first peripheral device cannot be accessed without authentication via the second peripheral device thereby producing a security result that may be converted by the host computer to an authentication phrase useful as a credential allowing access to the first peripheral device conditioned upon the presence of and successful authentication to the second peripheral device;
to receive the security result from second peripheral device;
to convert the security result to an authentication phrase candidate for the first peripheral device;
to attempt authentication to the first peripheral device using the authentication phrase candidate for the first peripheral device; and
to receive an authentication result from the first peripheral device indicating success or failure of the authentication attempt.

11. The method for providing authentication of a user of claim 10 further comprising:
upon first use of the first peripheral device, operating the host computer:
to authenticate the user to the second peripheral device;
upon successful authentication to the second peripheral device, to request the second peripheral device to execute the security function designated by the host computer thereby producing a security result;
converting the cryptographic result to an authentication phrase;
causing the authentication phrase to become the expected authentication phrase used by the first peripheral device to determine whether to allow access to the first peripheral device by a user thereby uniquely linking the first peripheral device to the second peripheral device.

12. A computer having a processor and connectors allowing connection to at least two peripheral devices, the computer processor being programmed to allow authentication to a first peripheral device be accomplished using authentication on a second peripheral device, the computer being programmed with instructions directing the computer to:

to request the user to commence an authentication process for the second peripheral device;

to attempt to authenticate the user to the second peripheral device;

upon successful authentication to the second peripheral device, to request the second peripheral device to execute a security function designated by the host computer and that utilizes a unique characteristic of the second peripheral device to produce a result that uniquely links the second peripheral device to the first peripheral device thereby producing a security result;

to receive the security result from the second peripheral device;

to convert the security result to an authentication phrase candidate for the first peripheral device;

to attempt authentication to the first peripheral device using the authentication phrase candidate for the first peripheral device; and to receive an authentication result from the first peripheral device indicating success or failure of the authentication attempt.

13. A method for providing authentication of a user to a first peripheral device connected to a host computer using an authentication of the user on a second peripheral device also connected to the host computer, allowing the user access to both devices through a single authentication, comprising:

uniquely linking the first peripheral device and to the second peripheral device through an authentication phrase created by the second peripheral device wherein the authentication phrase reflects a unique characteristic of the second peripheral device and that ensures that the first peripheral device cannot be accessed without authentication via the second peripheral device and using the authentication phrase to create an encrypted virtual drive data file on the first peripheral device;

operating the second peripheral device to cause the user to authenticate to the second peripheral device;

upon attempting to use the encrypted virtual drive on the first peripheral device, obtaining a candidate authentication phrase from the second peripheral device; and attempting to mount the encrypted virtual drive data file using the candidate authentication phrase wherein only the correct authentication phrase would successfully decrypt the encrypted virtual drive.

14. The method for providing authentication of a user to a first peripheral device connected to a host computer using an authentication of the user on a second peripheral device also connected to the host computer of claim 13 wherein the authentication phrase is generated by requesting the second peripheral device to cryptographically sign a reference data item thereby uniquely linking the first peripheral device to the second peripheral device.

15. The method for providing authentication of a user to a first peripheral device connected to a host computer using an authentication of the user on a second peripheral device also connected to the host computer of claim 13 wherein the authentication phrase is stored on the second peripheral device.

* * * * *